United States Patent Office 2,828,183
Patented Mar. 25, 1958

2,828,183
PRODUCTION OF SODIUM PERBORATE

David F. Altimier, Niagara Falls, and Walter Klabunde, Lewiston, N. Y., assignors to E. I. du Pont de Nemours & Company, Wilmington, Del., a corporation of Delaware No Drawing. Application December 21, 1954
Serial No. 476,834

16 Claims. (Cl. 23—60)

This invention relates to an improved method for producing sodium perborate.

The usual sodium perborate of commerce has a composition corresponding roughly to the formula $$NaBO_3.4H_2O$$

and is generally referred to as "sodium perborate tetrahydrate" or simply "sodium perborate." One method for its preparation is that of Carveth U. S. Patent 1,716,874 involving the addition of hydrogen peroxide to a cold solution of sodium metaborate. The resulting product crystallizes from the solution generally as agglomerates of small crystals. Another method is that of Nees U. S. Patent 2,380,779 involving the addition of a solution of an alkaline sodium compound to a solution of hydrogen peroxide and borax. A light or low bulk density product is obtained as fine particles. Both methods are strictly batch processes in which uniformity of product from batch to batch is difficult to control and both yield products which tend to cake when exposed to high summer temperatures. Furthermore, it was considered highly desirable, if not essential, in both methods to employ low reaction temperatures, e. g., 5 to 15° C., in order to obtain satisfactory active oxygen recoveries and to provide proper conditions for crystal growth.

It is an object of the present invention to provide an improved method for producing sodium perborate. Another object is to provide a method in which the reaction to produce sodium perborate can be effectively carried out at temperatures considerably higher than heretofore regarded as practical, whereby refrigeration costs are greatly reduced. A further object is to provide a method whereby sodium perborate is obtained which is resistant to caking at elevated temperatures and has excellent pouring characteristics. A still further object is to provide a method for producing such a product, which method is admirably well suited for the continuous production of sodium perborate of uniform quality. Still further objects will be apparent from the following description.

The objects of the invention are accomplished by reacting hydrogen peroxide with sodium metaborate in an aqueous slurry of sodium perborate while avoiding the presence of free hydrogen peroxide in the liquid phase of the slurry, and while maintaining therein a sodium tetraborate concentration, calculated as borax $(Na_2B_4O_7.10H_2O)$, of at least 8 grams per liter. Preferably, the absence of free hydrogen peroxide, i. e., hydrogen peroxide in excess of that amount required to produce sodium perborate in accordance with the equation (a) $NaBO_2.2H_2O + H_2O_2 + H_2O = NaBO_3.4H_2O$ will be assured by maintaining in the liquid phase a slight excess of the metaborate, on the order of 1 to about 40 grams per liter. Most preferably, the metaborate excess will be such that the pH of the liquid phase will be within the range of 9.4 to 9.9.

Also preferably, and in sharp contrast with prior methods, the above reaction will be carried out at a temperature of at least 20° C. and most preferably at a temperature within the range 25 to 40° C. Still higher temperatures, e. g., up to about 50° C. and higher, can be used but with some sacrifice in active oxygen recovery. It has been found that the presence in the liquid phase of the reaction slurry of free sodium tetraborate in an amount corresponding to at least 8 grams of borax per liter is essential, particularly at the preferred reaction temperatures, to provide the conditions necessary for crystallization of the product in the desired crystal habit. The absence of free hydrogen peroxide, e. g., by maintaining a slight excess of metaborate corresponding to a pH in the range indicated, is essential to assure the desired particle growth. It has been found that when these two conditions are observed, sodium perborate of desired crystal structure and resistant to thermal caking can be produced consistently and with active oxygen recoveries of around 95% and upward, even at reaction temperatures of 25 to 40° C. This is highly advantageous over the use of reaction temperatures of around 10° C., as generally required in prior methods, because of the large savings in refrigeration requirements. A further distinct advantage is that the perborate product is outstandingly resistant to caking and retains its free-flowing properties much better than prior products even at relatively high temperatures.

The present method can be operated at the relatively low temperatures characteristic of prior methods but because of the excellent results obtained at temperatures of 25 to 40° C., including the important savings in refrigeration costs, reaction at temperatures in that range is very definitely preferred. Following the reaction, it is preferred to cool the reaction mixture to below 20° C. e. g., to about 10° C., to increase precipitation of product. Such practice requires but little refrigeration compared with that required when the reaction is carried out at 10° C.

The present method can be practiced batchwise or continuously. Illustrative of the former, the amounts of the reactants, e. g., solutions of hydrogen peroxide and metaborate, required for a batch of product are fed continuously to a reaction slurry of suitable composition while agitating and cooling the slurry as desired. The feed rates are proportioned so that the resulting reaction slurry always contains the desired excess of the metaborate. The required free borax is conveniently added as a constituent of the metaborate solution, or a solution of borax can be added separately at a suitable rate. When all reactants have been added, the product slurry can be directly filtered or centrifuged to separate the product which is then subjected to the usual drying treatment, e. g., in a rotary drier, to remove adhering moisture from the crystals. The mother liquor can be used in preparing metaborate feed solution for a succeeding preparation in which part of the product slurry from a previous preparation is used as the starting reaction slurry.

The present method is well suited for continuous operation which is much preferred. In one continuous embodiment of the invention found to be highly practical and to produce consistently product of uniform desired quality, separate solutions of hydrogen peroxide and sodium metaborate are continuously fed to an agitated reaction slurry maintained at about 30° C. The solutions are fed at such relative rates as will maintain the slurry at a pH within the range 9.4 to 9.9. The metaborate feed solution contains free borax at a concentration designed to provide a free borax concentration in the aqueous phase of the slurry of at least 8 and preferably 15 to 25 grams per liter. The starting reaction mixture can be a slurry of perborate crystals in mother liquor from a preceding preparation, or a slurry of sodium perborate to which has been added free borax to provide the borax concentration indicated. Product slurry is withdrawn continuously from the reaction mixture at a rate corresponding to the rates of feed of the reactant solutions. When the reaction is effected at a temperature above about 20° C., it is generally advantageous to cool the withdrawn product slurry to about 10° C. to effect more complete precipitation of product before the product is separated from the mother liquor. The separated product is then dried in the customary manner while the mother liquor is preferably reused as solvent for the metaborate reactant.

In preparing the metaborate feed solution, borax and sodium hydroxide may be added to and reacted in mother liquor (or fresh water) to produce metaborate according to the equation (b)
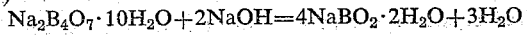
$$Na_2B_4O_7 \cdot 10H_2O + 2NaOH = 4NaBO_2 \cdot 2H_2O + 3H_2O$$

Sodium peroxide may be used in place of sodium hydroxide, in which case the equation for the reaction to produce metaborate is (c)
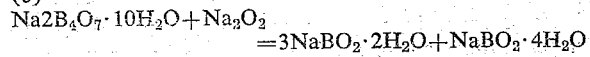
$$Na_2B_4O_7 \cdot 10H_2O + Na_2O_2 = 3NaBO_2 \cdot 2H_2O + NaBO_3 \cdot 4H_2O$$

In such case, the sodium peroxide will provide 25% of the total active oxygen requirement. Regardless of which alkali is used, such a deficiency of the alkali will be employed as will leave an excess of borax equal to at least 8 g. per liter. However, the free borax required in the perborate reaction mixture can, if desired, be added separately to the reaction mixture at a rate controlled to provide the desired borax concentration therein.

Sodium perborate was made in several runs employing as reactants 35% aqueous hydrogen peroxide and metaborate solutions containing about 200 grams per liter of sodium metaborate ($NaBO_2$). The metaborate solution for each run was prepared by reacting borax with sodium peroxide according to equation (c) employing mother liquor from a preceding run as solvent. Prior to use, each metaborate solution was tested for its Na:B balance by adding 4 to 5 grams of mannitol and several drops of phenolphthalein to a 1 ml. test sample diluted to about 25 ml. A colorless test solution indicated the presence of excess borax, the amount of which was determined by titration with N/10 NaOH to a pink end point. If the test solution remained pink on addition of the phenolphthalein, it was titrated with N/10 HCl to determine the amount of excess alkali present. Three liters of the metaborate solution were then adjusted by the addition of the calculated amount of sodium hydroxide or borax, based upon the test results, to give the free borax concentration indicated in the table below.

In each run, a starting seeded heel was prepared by adding 50 grams of sodium perborate tetrahydrate to 750 ml. of distilled water in a 4 liter reactor in a water bath. Borax was added to the heel so as to provide therein a borax concentration the same as that in the metaborate solution to be used. After the contents of the reactor had been brought to the operating temperature, the metaborate solution was fed thereto to bring the pH of the heel to the desired value. Thereafter, the metaborate solution was fed continuously at a constant rate of between 25 to 30 ml. per minute while the hydrogen peroxide solution was added simultaneously and continuously at such a rate as was necessary to maintain the resulting mixture at the selected pH value. The reaction mixture was stirred throughout each run and the reaction temperature was regulated by adjusting the temperature of the water bath as needed.

After 1 hour, feeding of the reactants was discontinued, the resulting mixture was cooled to 10° C. and the product separated by centrifuging. The product, after drying in thin layers on stainless steel trays for 16 hours at room temperature, was checked for active oxygen content, crystal habit and thermal caking properties. The results obtained are indicated below.

*Table*

| Run | g./l. Free Borax in Liquid of Reaction Mixture | Operating pH.[1] | Reaction Temp. (° C.) | Active Oxygen in Prodt. (percent) | Crystal Habit |
|---|---|---|---|---|---|
| 1 | 0 | 10.05 | 25 | 10.43 | Thin plates. |
| 2 | 0 | 10.2 | 35 | 10.34 | Do. |
| 3 | 10 | 9.7 | 35 | 10.39 | Heavy bars with some thin plates. |
| 4 | 20 | 9.55 | 35 | 10.37 | Heavy bars. |
| 5 | 20 | 9.4 | 35 | 10.38 | Do. |
| 6 | 20 | 9.55 | 35 | 10.37 | Do. |
| 7 | 25 | 9.65 | 35 | 10.40 | Do. |
| 8 | 30 | 9.8 | 35 | 9.39 | Heavy bars studded with borax crystals. |

[1] pH measured continuously on a pH meter using glass and calomel electrodes.

The products of Runs 1 and 2, obtained as thin fragile plates, were not free flowing as produced and were, therefore, not tested to determine their resistance to caking at elevated temperatures. The products of the remaining runs were initially all free flowing and remained so after being packed under a pressure of 18 pounds per square inch in a paper cylinder and then heated for 16 hours at 50° C. in a covered glass container. Their resistance to caking under these conditions is truly remarkable since product prepared by the method of Patent 1,716,874 and also commercial products originating from the Netherlands, Great Britain and Italy, were found to cake badly under similar conditions. The ability to withstand caking at such elevated temperatures is a highly desirable property since product is frequently subjected during storage to fairly high temperatures, e. g., summer temperatures.

While the product from Run 3 was free flowing and remained so after being subjected to the above test conditions, it contained some thin plates indicating that had substantially less than 10 grams per liter of free borax been present in the liquid phase of the reaction mixture, the proportion of plates in the product would have been too high for the product to be free flowing. Experience has indicated that the free borax concentration should range from about 8 grams per liter up to the saturation concentration for borax, 10 to 30 grams per liter being generally satisfactory. The preferred range is about 15 to 25 grams per liter. At concentrations of about 30 grams per liter, borax may tend to separate out with the product. This is not particularly harmful but is generally undesirable because the borax acts as a diluent for the desired perborate.

While 8 grams of borax per liter has been indicated as approximately the minimum effective concentration, it should be noted that somewhat lower concentrations may be usable at reaction temperatures substantially below 20° C. However, concentrations within the ranges indicated are advantageous for the additional reason that the presence of borax at such concentrations makes it practical to control the amount of excess metaborate also present by simple pH measurements. With borax concentrations within the ranges indicated, a pH below about 9.4 indicates that no substantial excess of metaborate is present, while a pH within the range 9.4 about 9.9, most preferably 9.5 to 9.7, indicates the desirable concentrations of excess metaborate which may range up to about 40 grams per liter, depending somewhat upon the amount of free borax present. At higher excess metaborate concentrations than those indicated by a pH of about 9.9, resistance of the product to caking, particularly at high humidities, decreases markedly. Control of free metaborate concentration by controlling the relative rates of feed of the reactants as indicated by pH measurement is highly practical. Suitable continuously indicating or recording pH measuring systems, e. g., using glass and calomel electrodes, are well known and available commercially.

The boron requirements for the perborate can be supplied as preformed sodium metaborate, as borax or as boric acid, but the use of borax in its anhydrous or any of its hydrated forms is generally preferred for economic reasons. If the boron source is a compound other than sodium metaborate, that compound can be fed to the reaction mixture along with, but separately from, suitable proportions of an alkali such as sodium hydroxide or sodium peroxide, so that the metaborate is formed in situ in the reaction mixture. However, it is preferred to start with borax and to convert this by means of sodium hydroxide or sodium peroxide to a metaborate solution containing the desired free borax concentration and then to feed the resulting solution simultaneously with but separately from the hydrogen peroxide solution as previously indicated.

Almost any aqueous hydrogen peroxide solution can be used in practicing the invention, those of the usual commercial concentrations containing from around 20% or more $H_2O_2$ by weight being suitable. Solutions containing from about 35 to 50% or more $H_2O_2$ are preferred in order to avoid introduction of excessive amounts of water into the system.

The production of product resistant to thermal caking is an outstanding advantage of the present method. A further important advantage is that the method can be successfully practiced at relatively high reaction temperatures with excellent active oxygen recoveries and with important savings in refrigeration costs. A still further advantage is that the method is well adapted for the continuous production of product of uniform desirable properties.

We claim:

1. The method of producing sodium perborate tetrahydrate comprising reacting hydrogen peroxide and sodium metaborate in an aqueous slurry of sodium perborate tetrahydrate while avoiding the presence of free hydrogen peroxide in the liquid phase of said slurry and while maintaining in said liquid phase a free borax concentration of at least 8 grams per liter, and crystallizing sodium perborate tetrahydrate from said liquid phase.

2. The method of claim 1 wherein the reaction is effected at a temperature of at least 20° C.

3. The method of producing sodium perborate tetrahydrate comprising reacting hydrogen peroxide and sodium metaborate in an aqueous slurry of sodium perborate tetrahydrate while maintaining in the liquid phase of said slurry a free borax concentration of at least 8 grams per liter and an excess of sodium metaborate at a concentration up to about 40 grams per liter, and crystallizing sodium perborate tetrahydrate from said liquid phase.

4. The method of producing sodium perborate tetrahydrate comprising adding aqueous solutions of hydrogen peroxide and sodium metaborate to an aqueous slurry of sodium perborate tetrahydrate maintained at a temperature of at least 20° C., the additions of said solutions being proportioned so as to maintain in the liquid phase of said slurry an excess of the metaborate at a concentration up to about 40 grams per liter, and simultaneously maintaining in said liquid phase free borax at a concentration ranging from about 8 to 30 grams per liter, and crystallizing sodium perborate tetrahydrate from said liquid phase.

5. The method of claim 4 wherein the slurry is maintained at a temperature in the range of about 25 to 40° C.

6. The method of producing sodium perborate tetrahydrate comprising maintaining an aqueous slurry of sodium perborate tetrahydrate at a temperature of 20 to 50° C. while maintaining in the liquid phase of said slurry a free borax concentration of about 10 to 30 grams per liter and while feeding to said slurry solutions of hydrogen peroxide and sodium metaborate at such relative rates as will maintain said slurry at a pH within the range 9.4 to 9.9, and crystallizing sodium perborate tetrachloride from said liquid phase.

7. The method of claim 6 wherein the slurry is maintained at a temperature within the range of 25 to 40° C.

8. The method of claim 7 wherein the slurry is maintained at a pH of 9.5 to 9.7 and the free borax concentration is maintained within the range 15 to 25 grams per liter.

9. The method of producing sodium perborate tetrahydrate comprising continuously maintaining in a reactor an agitated aqueous slurry of sodium perborate tetrahydrate at a temperature of 20 to 50° C. while continuously maintaining in the liquid phase of said slurry free borax at a concentration of 10 to 30 grams per liter, continuously feeding to said slurry aqueous solutions of hydrogen peroxide and sodium metaborate at such relative rates as will maintain said slurry at a pH within the range 9.4 to 9.9, continuously withdrawing slurry from said reactor at a rate corresponding to the rates of feed of said hydrogen peroxide and metaborate solutions, and separating sodium perborate tetrahydrate from the withdrawn slurry.

10. The method of claim 9 wherein the withdrawn slurry is cooled to a temperature below 20° C. before sodium perborate tetrahydrate is separated therefrom.

11. The method of claim 9, wherein the slurry in the reactor is maintained at a temperature within the range 25 to 40° C.

12. The method of producing sodium perborate tetrahydrate comprising continuously maintaining in a reactor an aqueous slurry of sodium perborate tetrahydrate at a temperature of 20 to 50° C., the liquid phase of said slurry containing free borax at a concentration of 10 to 30 grams per liter and having a pH within the range 9.4 to 9.9, continuously feeding aqueous solutions of hydrogen peroxide and sodium metaborate to said slurry at such relative rates as will maintain the pH within said pH range, said metaborate solution containing free borax at a concentration of 10 to 30 grams per liter, continuously withdrawing slurry from said reactor at a rate corresponding to the rates of feed of said hydrogen peroxide and metaborate solutions, and separating sodium perborate tetrahydrate from the withdrawn slurry.

13. The method of claim 12 wherein the slurry in the reactor is maintained at a temperature of 25 to 40° C.

14. The method of claim 12 wherein the withdrawn slurry is cooled to a temperature below 20° C. before sodium perborate tetrahydrate is separated therefrom.

15. The method of claim 14 wherein borax and an alkali from the group consisting of sodium hydroxide and sodium peroxide are reacted in the mother liquor from the withdrawn slurry to provide sodium metaborate feed solution for continuing the production of perborate.

16. The method of producing sodium perborate comprising continuously maintaining in a reactor an aqueous slurry of sodium perborate at a temperature of 25 to 40° C., the liquid phase of said slurry having a pH in the range 9.5 to 9.7 and containing free borax at a concentration of 15 to 25 grams per liter, continuously feeding aqueous hydrogen peroxide and sodium metaborate solutions to said slurry at such relative rates as will maintain the pH within said pH range, said metaborate solution containing free borax at a concentration of 15 to 25 grams per liter, continuously withdrawing slurry from said reactor at a rate corresponding to the rates of feed of said hydrogen peroxide and metaborate solutions, cooling the withdrawn slurry to a temperature below 20° C. and separating sodium perborate therefrom.

References Cited in the file of this patent

UNITED STATES PATENTS

| | | |
|---|---|---|
| 1,716,874 | Carveth | June 11, 1929 |
| 2,380,779 | Nees | July 31, 1945 |
| 2,491,789 | Young | Dec. 20, 1949 |

U. S. DEPARTMENT OF COMMERCE
PATENT OFFICE

CERTIFICATE OF CORRECTION

Patent No. 2,828,183                            March 25, 1958

David F. Altimier et al.

It is hereby certified that error appears in the printed specification of the above numbered patent requiring correction and that the said Letters Patent should read as corrected below.

Column 3, line 45, last chemical formula in equation (c), for "$NaBO_2 \cdot 4H_2O$" read -- $NaBO_3 \cdot 4H_2O$ --; column 6, lines 23 and 24, for "tetra-chloride" read -- tetra-hydrate --.

Signed and sealed this 20th day of May 1958.

(SEAL)

Attest:

KARL H. AXLINE
Attesting Officer

ROBERT C. WATSON
Commissioner of Patents